(12) United States Patent
Ewald

(10) Patent No.: US 7,410,519 B1
(45) Date of Patent: Aug. 12, 2008

(54) SANDWICH FILTER BLOCK

(76) Inventor: Dieter H. Ewald, 26131 Altadena Dr., Los Altos Hills, CA (US) 94022

( * ) Notice: Subject to any disclaimer, the term of this patent is extended or adjusted under 35 U.S.C. 154(b) by 550 days.

(21) Appl. No.: 11/204,912

(22) Filed: Aug. 16, 2005

(51) Int. Cl.
*B01D 46/00* (2006.01)
*F16K 27/00* (2006.01)

(52) U.S. Cl. .................. 55/385.1; 55/417; 55/420; 55/503; 55/504; 55/525; 137/544; 137/884

(58) Field of Classification Search ........... 55/516–519, 55/525, 526, 510, 503, 504, 385.1, 420, 417; 137/884, 269, 270, 271, 544, 546, 549, 550, 137/597

See application file for complete search history.

(56) References Cited

U.S. PATENT DOCUMENTS

| | | | |
|---|---|---|---|
| 4,259,099 A | 3/1981 | Akabane et al. | 55/482 |
| 4,382,808 A | 5/1983 | Van Wormer, Jr. et al. | 55/418 |
| 5,545,242 A | 8/1996 | Whitlock et al. | 55/502 |
| 5,819,782 A * | 10/1998 | Itafuji | 137/240 |
| 6,273,139 B1 * | 8/2001 | Ohmi et al. | 137/884 |
| 6,302,141 B1 | 10/2001 | Markulec et al. | 137/269 |
| 6,514,323 B1 | 2/2003 | Palermo et al. | 95/273 |
| 6,546,961 B2 | 4/2003 | Fukushima | 137/884 |
| 6,615,870 B2 * | 9/2003 | Tsourides | 137/884 |
| 6,659,131 B2 | 12/2003 | Tsourides | 137/884 |
| 6,769,463 B2 * | 8/2004 | Vu | 141/98 |
| 6,886,599 B2 | 5/2005 | Ichikawa et al. | 137/884 |
| 7,017,609 B2 * | 3/2006 | Miwa | 137/884 |

* cited by examiner

*Primary Examiner*—Duane Smith
*Assistant Examiner*—Robert A Clemente
(74) *Attorney, Agent, or Firm*—Schneck & Schneck

(57) ABSTRACT

A sandwich filter device including a block body and an insert held in the block body. The insert and the block body each have a passage for gas flow through. Positioned across the insert passage is a filter for removing contaminants from a gas stream.

16 Claims, 3 Drawing Sheets

SECTION A-A

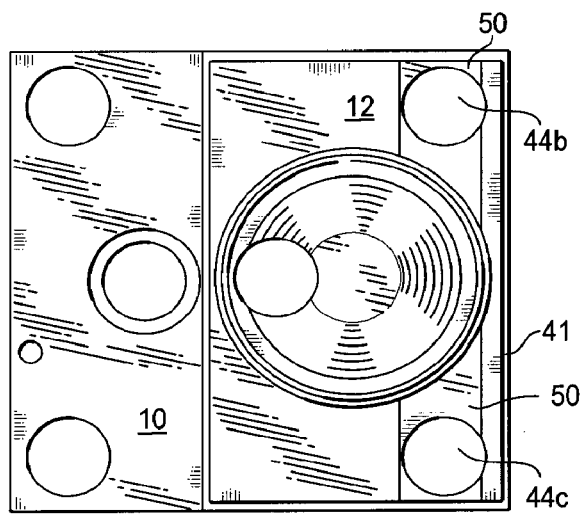
Fig._4a
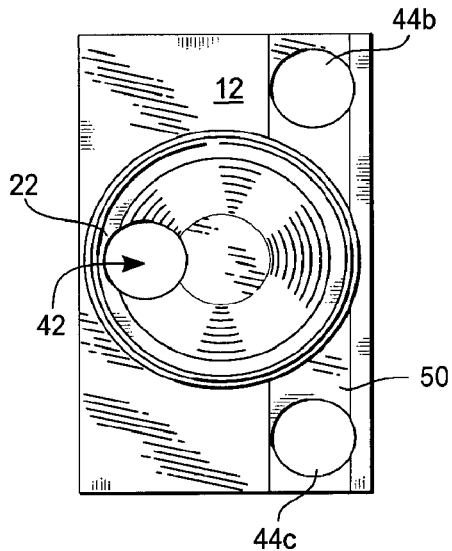
Fig._4b
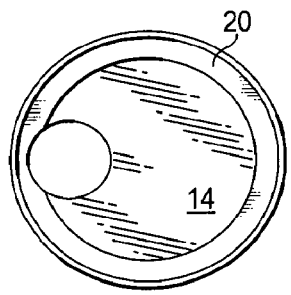
Fig._4c

SANDWICH FILTER BLOCK

TECHNICAL FIELD

The present invention relates to gas filtration devices.

BACKGROUND

In semiconductor manufacturing, gasses are used for a number of purposes, including the creation of plasma for etching a silicon or other wafer surface, ending reactions by introduction of inert gasses, etc. In the manufacturing chamber, a selected type of process gas is introduced into the process chamber as part of a specified step in the manufacturing process. A selected type of gas must be introduced within purity tolerances, at a specified flow rate and at a specified pressure and volume.

A number of different components of a gas transport system regulate the flow of gas to the process chamber. These components may include a mass flow controller, valves, regulators, filters, flow monitors, moisture monitors, gas purifiers, pressure sensors, diffusers, pressure transducers, among other components. In prior systems these components were arranged side by side, connected by a series of in line connectors. Each of the components is used for a specific function, such as a pair of valves connected between another component that allow isolation of that component. The components are connected in line along the horizontal flow path of the gas. Both the component and the connector add to the overall length of the entire gas transport system.

In semiconductor manufacturing, uniform standards that have been adopted to minimize the footprint required for a gas transport system. One method to reduce the length of the system is to have the gas flow into and out of the bottom of each component, rather than from the sides or top and bottom. In one current standard configuration, each of the components is mounted on a base plate. This base plate may have one of two configurations. In a first configuration, the base plate serves as nothing more than a support structure for gas flow devices. A separate system of blocks below each gas flow element provides a passage for fluid to flow from each element. An example of such as system is shown in U.S. Pat. No. 6,546,961, in which a number of passage blocks include passages from one gas flow component to another. A disadvantage of such systems is the added height requirement of the blocks. This may be a significant drawback, especially if the gas flow systems are going to be stacked. A second alternative is to provide passages in the base plate. In this manner, the individual gas flow elements may be connected using base plate without the need for additional connection blocks. This configuration has the added advantage that the height of the combined gas flow component and the base plate is not further raised by an underlying block.

In systems in which the gas flow components are used with a base plate, one gas flow component, the filter, may be designed such that it does not add to the length of the system. This would be done by using a block under one gas flow component in which the filter is incorporated. In the first configuration outlined above, the filter may be incorporated into one of the blocks. For example in U.S. Pat. No. 6,886,599 discloses a gas supply system including a number of gas supply components connected to each other through blocks positioned between each component and providing a passageway between each component for gas flow. The filter block component is a block extending between two gas flow components.

In the second configuration outlined above (in which the base includes fluid flow passageways) a block may also be included for the filtering of gas. This again allows elimination of one element from the length of the gas flow components. This comes at the cost of some added height to the system. One solution is to use a surface mount sandwich filter. For example, one surface mount filter is produced by TEM Filter Company and sold as product TEM 837125. This filter block is mounted between the base plate and a gas flow component. By placing the filter block under a valve or regulator, a separate filter substrate is not required, effectively shortening the filtration system and reducing the cost of the system. About an inch of height would be added to the component under which this filter block is inserted. This filtration block may be used with stainless steel filter media, high flow sintered nickel fiber media, or any other suitable media.

However one drawback of this filter block is the added height the block adds to the system. However manufacturing a shorter filter block has proved challenging. The primary challenge is designing a filter block that conforms to the industry standards, which set specifications for the systems. In some of these standards, the components have inlets and outflows that are essentially adjacent, requiring a filter block with similarly positioned passageways. It has proved difficult to manufacture a filter block that is both lower profile, has desired performance and conforms to the standardized configuration. It is an object of the present device to overcome these obstacles.

SUMMARY

The above objectives have been achieved through using a two-piece passage block. This passage block includes a block body that has a first fluid pass through passage. The block body includes an insert retainer that holds an insert having a second fluid pass through passage. Secured across this through passage is a filter, such as a sintered nickel fiber filter or a sintered stainless steel fiber filter. The height of the filter block when positioned below a gas flow component may be one quarter inch or less. The two-piece passage block may also be incorporated as part of a gas supply device that includes a plurality of fluid control devices. A base having a plurality of passageways is positioned below each device to allow fluid to pass from one device to the next. A passage block is positioned below at least one of the devices. This block includes a block body having a first fluid pass through passage and an insert retainer. Retained within the retainer is an insert that includes a second pass through passage. Across this passage is positioned a filter, such as the filers noted above. The height of the filter block allows the system to have a minimal height, allowing for stacking a greater number of the gas flow components.

BRIEF DESCRIPTION OF THE DRAWINGS

FIG. 4a is a bottom view of the block body of the filter block shown with a first part of the filter block insert.
FIG. 4b is the first part of the filter block insert.
FIG. 4c is a second part of the filter block insert.

DETAILED DESCRIPTION

Figure 1:
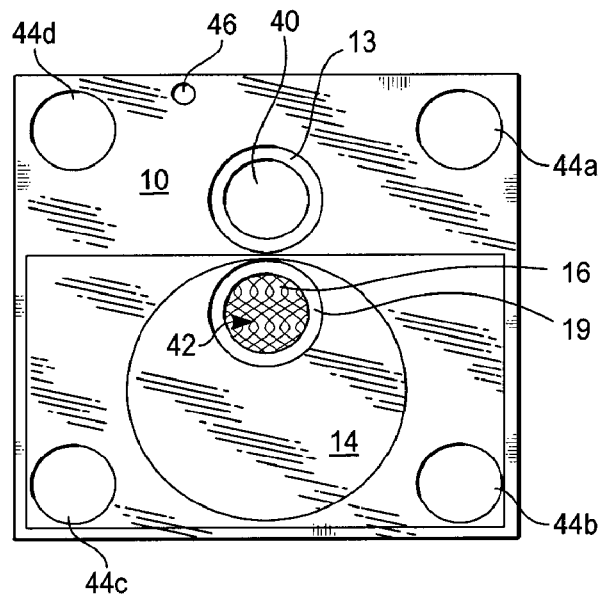
FIG. 1 is a bottom view of an embodiment of a filter block.

With reference to FIG. 1, the bottom view of the filter block shows the block body 10 holding an insert 14. The block body 10 includes a first fluid pass through passage 40. An annular groove 13 at a first end of passage 40 is recessed into block body 10. Groove 13 may hold a deformable C gasket, to ensure leak free fluid passage into the open end of a connecting passage, such as a base plate underlying the block. In a similar manner, insert 14 includes a second fluid pass through passage 42. Positioned across the end of this passage is a filter membrane 16. Annular groove 19 holds a deformable C gasket (not shown) which again allows this opening to seal against the base plate.

A number of holes allow the device to be secured fixedly in place. Hole 46 is the leak test hole. Alternate designs may use more than one such hole. Such holes are known in the art for testing for surface defects. Holes 44a-44d on the corners of the sandwich filter allow for bolts to be positioned through the holes. A bolt would extend through holes 44a-44d, securing the device in place. A bolt may pass through a hole on an overlaying fluid control device, through the holes on the sandwich filter, and be secured into the base block. Tightening these bolts also deforms the resilient member held in grooves 19, 13, ensuring a leak free seal to the base plate and the fluid control device.

Figure 2:
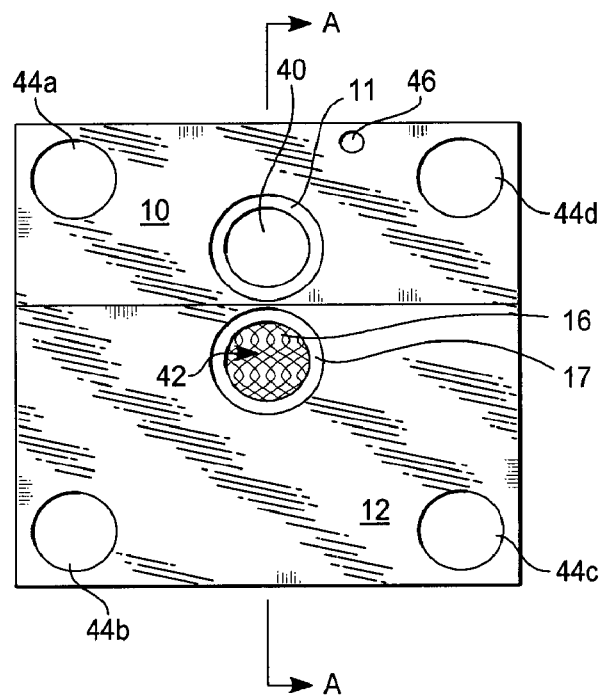
FIG. 2 is a top view of an embodiment of a filter block.

With reference to FIG. 2, the top side of the sandwich filter also shows the holes 44a-44d for mounting the device onto a base. Through passageways 40 and 42 are on the block body and the insert respectively. On this side, grooves 11 and 17 may hold C seal gaskets.

Figure 3:
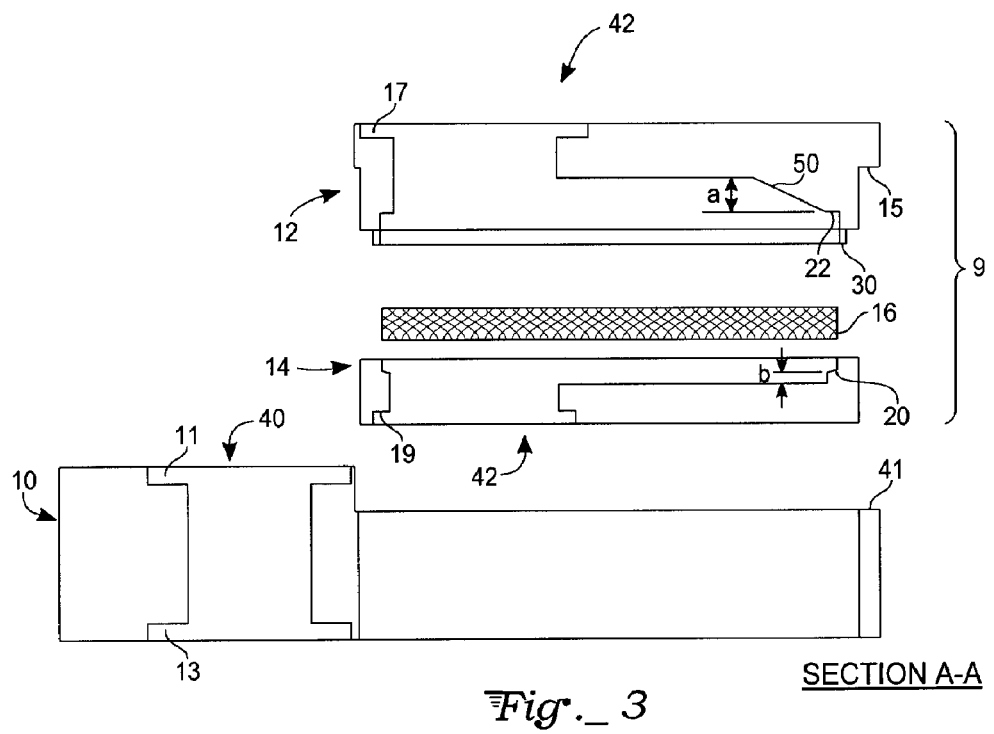
FIG. 3 is an exploded cross-sectional side view of components of an embodiment of the filter block

In FIG. 3, an exploded cross-sectional view of sandwich block filter device is shown. As is seen in FIGS. 1 and 2, the gas flow passageways on the sandwich filter are quite close together. This is a standardized configuration. In this configuration it is difficult to manufacture a filter block with the filter perpendicular to the longitudinal axis of the through passageway. However to achieve the lowest filter block profile, the filter must be in this orientation. This has been resolved by creating a two-part sandwich filter. The filter element may then be encased into an insert, which is fit into a block body on the filter block. This allows precision positioning of the through passages on the sandwich filter block. In FIG. 3, a block body includes a fluid through passage 40. At the ends of this passage are grooves 11, 13, which are annular grooves at the top of the passage 40. These allow holding a C seal gaskets such that the top surface may be sealed against the fluid control device and the bottom surface may be sealed against a base plate.

The insert is comprised of a top piece 12, a filter 16 and a bottom piece 14. The top piece 12 is welded or otherwise permanently joined to bottom piece 14 with the filter in between these two pieces. Ridge 30 of the top piece 12 is fit into a receiving groove on the lower piece prior to welding. This insert is then inserted into the block body 10 to form the final sandwich filter block. As shown in FIGS. 1, 2 with the insert set into place the filter block has a level top and bottom surface, as would be needed to prevent leaks. As in the block body, a fluid pass through passage 42 allows a gas to be introduced through the filter. Annular grooves 17, 19 allow the passage to be sealed against a surface, namely the base and a surface of a fluid control device.

The filter is retained between annular lip 22 on top piece 12 and annular lip 20 on bottom piece 14. This allows the filter to be frictionally held such that it will not be displaced. An annular angled surface 50 creates a space of maximal height "a" over the top of the filter. Below the filter lip 20 holds the filter at height "b" over the filter. These spaces create an area above and below the filter where gas may pass through the filter from one side of the filter to the other. The gas would then flow back though the fluid passageway.

Surface 15 of the insert fits against surface 41 on the block body when the insert is inserted into the block body, retaining the insert 14 in place.

In FIG. 4a, the two holes 44b and 44c are shown. When a bolt is inserted though these holes, the insert 14 is held securely in place respective to the block body 10. These two figures also illustrate the surface 15 on the insert 14 that is inserted against surface 41 of the block body.

In FIGS. 4b, 4c, the annular lips 20, 22 are shown in the top and bottom insert pieces prior to assembly. These lips are used to frictionally hold the filter in place when the insert is assembled.

This device may use any suitable filter type, including sintered stainless steel filter media or sintered nickel fiber media. These are preferably high flow materials. These filters retain greater than 99.9999999% of particles down to 0.003 microns. The filter may be made of stainless steel, with an internal finish of 5 or 10 Ra (roughness average). The filter block on a flat surface is not greater than 0.250 inch high, adding minimal height to the device under which the block has been positioned. This device may be used at an operational pressure of up to 750 PSI without leaks.

Figure 5:
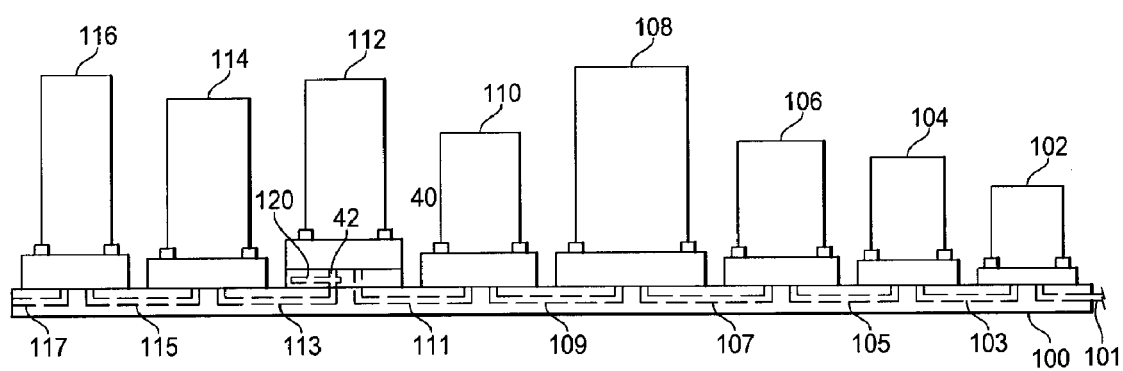
FIG. 5 is a side view of a gas control system.

With reference to FIG. 5, a gas supply device is illustrated including a plurality of fluid control devices, including an initial valve 102, a flow sensor 104, an isolation valve 106, a mass flow controller 108, a second isolation valve 110, a pressure sensor 112, a regulator 114 and a terminal valve 116. All of these elements are mounted to a base plate 100. A system of channels in the base plate both bring gas to and from each fluid control device. A channel 101 brings gas from a gas source to valve 102. Channel 103 connects this initial valve to flow sensor 104. In a similar manner channel 105 connects the outflow of flow sensor 104 to the inlet of isolation valve 106, channel 107 connects the outflow of isolation valve 106 to the inlet of mass flow controller 108, and channel 109 connects the out flow of mass flow controller 108 to the inlet of isolation valve 110. Channel 111 connects the outflow of isolation valve 110 to the first fluid pass through passage 40 on the passage block body of sandwich filter 120. Passage 40 connects to the inlet of pressure sensor 112. The outflow of pressure sensor 112 directs gas through second pass through passage 42 on sandwich filter block 120, causing the gas to pass through the filter held in filter block 120 before entering passage 113. Channel 113 connects the outflow from filter block 120 to the inlet of regulator 114. Gas flowing from the outlet of regulator 114 passes into channel 115 which connects to the inlet of terminal valve 116. The outflow of terminal valve 116 connects to channel 117, which flows to a process chamber. The height added by filter block 120 to pressure sensor 112 is sufficiently small that the combination of the pressure sensor 112 and the filter block 120 is less than or equal to the tallest fluid control device, commonly the mass flow controller. Thus the addition of the sandwich filter 120 adds no additional height to the illustrated gas flow device. The sandwich filter may be used under a valve, regulator or other gas regulation component.

What is claimed is:

1. A passage block comprising:
    a passage block body having an upper surface and a lower surface;
    a first fluid pass through passage from the upper surface to the lower surface of the block body;
    an insert retainer on the block body configured to have an upper surface substantially coplanar with the upper surface of the block body;
    an insert held in the insert retainer configured to have a lower surface substantially coplanar with the lower surface of the block body;
    a second fluid pass through passage on the insert and the insert retainer; and a filter disposed between the insert retainer and the insert such that fluid passing through the second fluid pass through passage passes through the filter.

2. The passage block of claim 1, wherein so the filter is a sintered nickel fiber filter.

3. The device passage block of claim 1, wherein said filter is a sintered stainless steel fiber filter.

4. The passage block of claim 1, wherein the passage block has a height of one quarter inch or less.

5. A passage block comprising:
   a passage block body having a first fluid passage configured to allow fluid flow through the block body; and
   an insert having a second fluid passage substantially parallel to the first fluid passage and configured to allow fluid flow through the insert, the insert further including:
      an insert retainer configured to mount on the block body; and
      a filter oriented substantially normal to a direction of flow of the second flow passage, the filter being disposed proximate to the second passage such that fluid passing through the second fluid passage passes through the filter.

6. The passage block of claim 5, wherein the filter is a sintered nickel fiber filter.

7. The passage block of claim 5, wherein the filter is a sintered stainless steel fiber filter.

8. The passage block of claim 5, wherein the passage block has an overall height of one quarter inch or less.

9. A gas supply device comprising:
   a passage block configured to be disposed between a gas-supply base and
   at least one fluid control device arranged to be mounted to the base, the passage block including:
      a passage block body;
      a first fluid passage formed through the block body;
      an insert retainer configured to fit in the block body;
      an insert configured to be held by the insert retainer;
      a second fluid passage on the insert and the insert retainer, the second fluid passage being substantially parallel to the first fluid passage; and
      a filter oriented substantially normal to a direction of the second fluid passage, the filter being disposed between the insert retainer and the insert such that fluid passing the second fluid passage passes through the filter.

10. The gas supply device of claim 9, wherein the filter is a sintered nickel fiber filter.

11. The gas supply device of claim 9, wherein the filter is a sintered stainless steel fiber filter.

12. The gas supply device of claim 9, wherein the passage block has an overall height of one quarter inch or less.

13. A gas supply device comprising:
   a base having a plurality of gas passageways;
   a plurality of fluid control devices; and
   a passage block disposed between the base and at least one of the fluid control devices, the passage block including:
      a passage block body having an upper surface and a lower surface;
      a first fluid pass through passage from the upper surface to the lower surface of the block body;
      an insert retainer on the block body configured to have an upper surface substantially coplanar with the upper surface of the block body;
      an insert held in the insert retainer configured to have a lower surface substantially coplanar with the lower surface of the block body;
      a second fluid pass through passage on the insert and the insert retainer; and
      a filter disposed between the insert retainer and the insert such that fluid passing through the second fluid pass through passage passes through the filter.

14. The gas supply device of claim 13, wherein the filter is a sintered nickel fiber filter.

15. The gas supply device of claim 13, wherein the filter is a sintered stainless steel fiber filter.

16. The gas supply device of claim 13, wherein the passage block has a height of one quarter inch or less.

* * * * *

UNITED STATES PATENT AND TRADEMARK OFFICE
CERTIFICATE OF CORRECTION

PATENT NO. : 7,410,519 B1
APPLICATION NO. : 11/204912
DATED : August 12, 2008
INVENTOR(S) : Dieter H. Ewald It is certified that error appears in the above-identified patent and that said Letters Patent is hereby corrected as shown below:

Column 1, line 40:

"...An example of such as system..." should read:

--An example of such a system...--.

Column 3, line 23:

"...cross-sectional view of sandwich..." should read:

--...cross-sectional view of a sandwich...--.

Column 3, line 62, fourth word:

"though" should read --through--.

Column 3, line 67, fourth word:

"though" should read --through--.

Column 5, claim 2:

"The passage block of claim 1 wherein so the filter is a sintered nickel fiber filter." should read:

--The passage block of claim 1, wherein the filter is a sintered nickel fiber filter.--.

UNITED STATES PATENT AND TRADEMARK OFFICE
CERTIFICATE OF CORRECTION

PATENT NO.        : 7,410,519 B1
APPLICATION NO.   : 11/204912
DATED             : August 12, 2008
INVENTOR(S)       : Dieter H. Ewald It is certified that error appears in the above-identified patent and that said Letters Patent is hereby corrected as shown below:

Column 5, claim 3:

"The device passage block of claim 1, wherein said the filter is a sintered..." should read:

--the passage block of claim 1, wherein the filter is a sintered...--.

Signed and Sealed this

Twelfth Day of May, 2009

JOHN DOLL
*Acting Director of the United States Patent and Trademark Office*